INVENTORS
R.W. BORDEWIECK, J.O. ROEBUCK, +
BY N.M. SLEEPER
Charles P. Fay, atty.

Patented Oct. 14, 1952

2,614,227

UNITED STATES PATENT OFFICE 2,614,227

CATHODE FOLLOWER PHOTOELECTRIC DIRECT CURRENT AMPLIFIER CIRCUIT

Robert W. Bordewieck, Southboro, and James O. Roebuck and Neal M. Sleeper, Worcester, Mass., assignors to Moore Electronic Laboratories, Incorporated, Worcester, Mass., a corporation of Massachusetts Application August 6, 1949, Serial No. 108,978

6 Claims. (Cl. 250—214)

This invention relates to an improved circuit for use in photoelectric relay equipment for automatic control of vehicle headlights. The improvements herein comprise the use of a twin-triode bridge amplifier tube wherein the cathode is common to both triode sections. This type of bridge construction cancels errors and shifts in tube characteristics caused by unequal aging of the two tubes, gasiness, vibration, and poor emission of one of the tubes, etc.

A further improvement resides in the use of a special guard circuit shield for the phototube which improvements result in the elimination of tube surface leakage and tube socket leakage which act in the manner of a light signal.

Further improvements in this circuit reside in the use of a time delay condenser from the signal grid to ground, said condenser being effective to achieve a desirable time delay in the operation of the device.

Other objects of the invention reside in the use of a twin cathode follower output stage to reduce the impedance of the plate circuit of the bridge amplifier to a reasonable value which will drive a rugged inexpensive relay; the application of inexpensive miniature neon glow tubes to regulate the plate voltage supply of the bridge amplifier and to supply a regulated voltage not exceeding the gas arc voltage of the gas phototube employed; the use of a lens to provide increased sensitivity as well as any desirable directional properties; the use of a filter disc to make the photoelectric relay sensitive to certain colors or certain frequencies or to make the photoelectric relay unit insensitive to certain frequencies of electromagnetic radiation; and the use of a voltage dropping tube to regulate the heater current of the bridge amplifier tube.

Other objects and advantages of the invention will appear hereinafter.

Reference is to be had to the accompanying drawings in which

Figure 1:
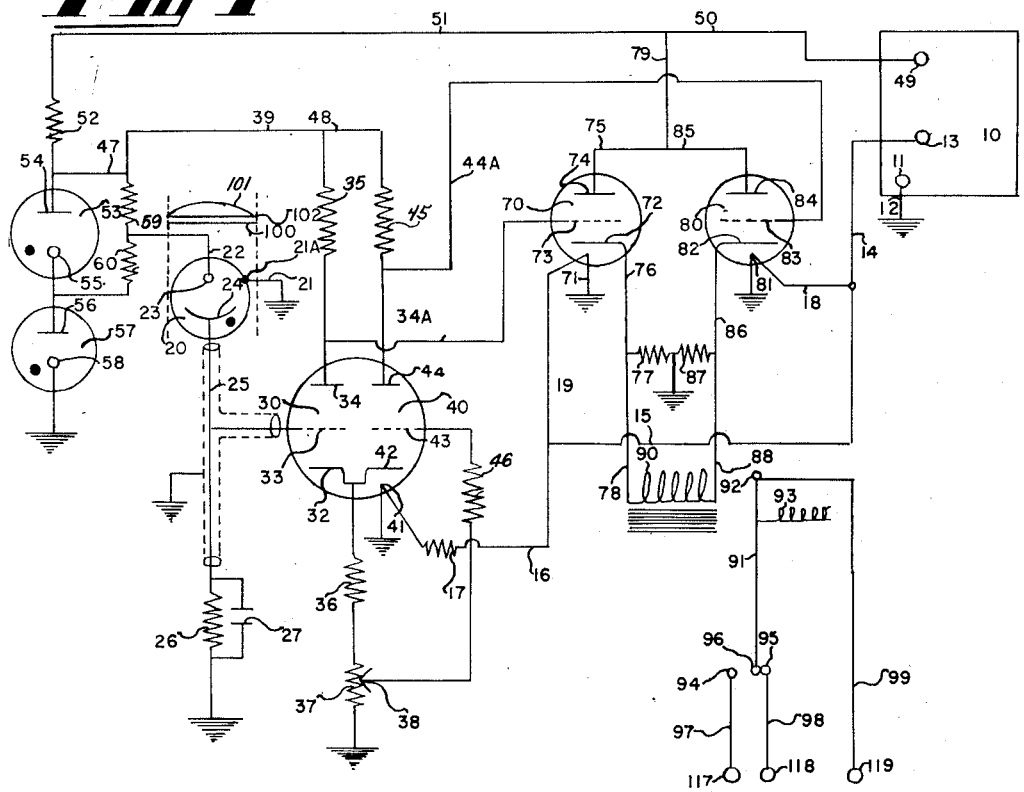
Fig. 1 is the schematic wiring diagram of the device.

Referring to Fig. 1, numeral 10 is an electrical power supply capable of supplying the proper low voltage to the tube heaters and high voltage for the plate circuit. The high voltage should be approximately 200 volts. The power supply may be connected to the regular A. C. or D. C. lines or may be composed of batteries or may be operated from a storage battery as a dynamotor supply or as a vibrapack power supply, or any equivalent system. The negative terminal of the high voltage supply 11 is grounded as by line 12. One side of the low voltage heater supply is also connected to point 11 and grounded by line 12. The hot side of the low voltage heater supply is connected from point 13 by lines 14 and 18 to the heater 81 of tube 80, by lines 15 and 19 to the heater 71 of tube 70, and by line 16 and resistor 17 to heater 41 of tubes 40 and 30. The other ends of heaters 41, 71, and 81 are grounded. Resistor 17 is a voltage dropping resistor used to drop the heater voltage of tubes 40 and 30 thus reducing cathode emission and grid current as well as gas effects in the tube thereby enabling use of high grid resistors. Because of the reduced heater voltage and extremely low plate current in this tube 30 and 40, its life is practically limitless. If resistor 17 is a current regulating barreter, which maintains a constant current through the heaters of the tubes 30 and 40 an improvement in the stability of the circuit is possible.

Resistor 17 must be of such value that the heater voltage of the twin triode bridge amplifier (a stage of voltage amplification) is reduced enough so that the cathode emission and therefore the space charge is reduced to a point where the number of electrons striking the grid is negligibly small. This permits the use of a 100 megohm grid resistor which heretofore was limited to a value of 1 to 5 megohms because the flow of electrons captured by the grid and flowing back to ground through such a resistor was formerly enough to bias the amplifier to cut-off or beyond. Since this grid resistor is also the output or load resistor of the phototube, increasing the value of the resistor increases the sensitivity of the phototube circuit, and an increase in overall gain of 20 to 100 times can be realized with a single stage of voltage amplification. This new combination of modified voltage amplifier and modified phototube circuit makes it possible to realize a sensitivity which heretofore was possible only in a combination of phototube circuit and two stages of voltage amplification. However, this single stage circuit does not have the instability attendant in two stage circuits where the necessity for direct coupling causes small changes of balance in the first stage to be amplified into large errors by the second stage. The second stage in the present circuit gives only power amplification for driving a rugged, inexpensive relay without providing any voltage amplification.

The high voltage terminal 49 is connected as by lines 50, 79, and 85 to plate 84 of tube 80, and by line 75 to plate 74 of tube 70, and by line 51 to voltage dropping resistor 52. Neon glow tubes 53 and 57 are connected in series from resistor 52 to ground. Resistors 59 and 60 are interconnected in series but in parallel with the neon tube 53 as a voltage divider to supply anode 23 of phototube 20 with a regulated voltage not exceeding 90 volts through line 22. Lines 47, 39 and 48 connect the regulated plate supply at anode 54 to plate load resistor 45 and thence to plate 44 of tube 40. Lines 47 and 39 connect to resistor 35 and thence to the plate 34 of tube 30. The cathode 24 of gas phototube 20 connects by ground shielded line 25 to grid 33 of tube 30 and to phototube load resistor 26 and time delay condenser 27 and thence to ground.

Resistor 26 is the load resistor for phototube 20, condenser 27 is the time delay condenser employed to slow up the action of the circuit, that is, before the voltage across resistor 26 can build up, condenser 27 must be charged and condenser 27 will discharge slowly through resistor 26 when the light signal is removed.

A conducting strip 21A is placed around the glass envelope of phototube 20 and between the two terminals on its base and is grounded as by line 21 thus providing a guard circuit for leakage across the phototube or its base. Any leakage from the high voltage anode through this strip cannot reach the cathode where it would act like a light signal if present.

Lens 101 and lens housing 102 are used to concentrate light on phototube cathode 24 thus increasing its sensitivity and because of the directional properties imparted by a lens in an enclosed housing, it provides directional properties to the unit. Filter disc 100 may be used to eliminate or pass certain bands of the light spectrum.

Grid 43 of tube 40 is connected by resistor 46 to potentiometer blade 38. Cathodes 32 and 42, which must be one homogeneous single cathode for both triode sections, are connected by resistor 36 and potentiometer 37 to ground. By moving slider 38 of potentiometer 37 upward, a positive signal caused by light on phototube 20 allowing current to flow through to resistor 26 can be canceled out; that is, the bias voltage developed across from slider 38 to ground will equal a small light signal voltage impressed across resistor 26 thereby maintaining the circuit in balance. A light signal voltage impressed on grid 33 lowers the voltage at anode 34 because of the increased plate current through plate load resistor 35, because of the common cathode circuit through resistor 36 and potentiometer 37, the bias on grid 43 increases with the plate current, effectively decreasing the plate current through tube 40 and resistor 45 thus raising the potential of plate 44 with signal applied.

Plate 34 is connected by line 34A to grid 73 of tube 70, plate 44 is connected as by line 44A to grid 83 of tube 80, and tubes 70 and 80 are both cathode follower tubes. Cathode 72 is connected by line 76 and resistor 77 to ground, cathode 82 is connected by line 86 and resistor 87 to ground. Relay 90 is connected by line 78 to cathode 72 and by line 88 to cathode 82. Contact 96 of armature 91 of relay 90 is held normally by spring 93 onto contact 95. When the light signal causes relay 90 to be actuated, armature 91 is pulled against the force of spring 93 and contact 96 moves from contact 95 to contact 94. Armature 91 is connected from point 92 by line 99 to external contact 119. Contact 95 is connected by line 98 to external contact 118 and contact 94 is connected by line 97 to external contact 117.

The operation of the circuit of Fig. 1 is as follows:

The power supply 10 supplies heater voltage for all tubes and plate voltage for the cathode follower tubes. The first stage of bridge amplification obtains its high voltage supply from the two neon tubes 53 and 57 connected in series to supply about 120 volts. With no light signal impressed on the phototube 20, grids 33 and 43 are at the same potential, resistors 26 and 46 are of the same magnitude, and self bias is built up across resistor 36 and potentiometer 37 to operate the plates 34 and 44 of the tubes 30 and 40 at approximately 60 volts each. The potential of these plates is applied through lines 34A and 44A to grids 73 and 83 of tubes 70 and 80 respectively. Resistors 35 and 45 are of the order of two megohms to provide as high gain as possible from the triode bridge. This also makes the plate current negligible and allows operation in the region of the tubes' characteristics where grid emission, gas effects, etc., are at a minimum. Tubes 70 and 80 being cathode follower tubes must build up sufficient self bias in their cathode resistors 77 and 87 to exceed the potential of the voltage applied to their grids. This means that approximately 65 volts will appear from each cathode to ground with no light signal and no current will flow through relay coil 90, which is a load device connected between the cathodes 72 and 82. When light is directed onto the phototube cathode 24, the resistance of the phototube decreases and a minute current flows through high resistor 26 to ground. By making this resistor on the order of 100 megohms an appreciable voltage is developed with a minimum of light signal. As explained before, this potential voltage developed across resistor 26 and applied to grid 33, increases the plate current of triode section 30 and because of the common cathode resistor of tubes 30 and 40 decreases the plate current of tube 40. The increased current through resistor 35 and plate 34 lowers the potential at plate 34. The reduced current through resistor 45 and plate 44 raises the potential of plate 44. These potentials are impressed through lines 34A and 44A onto the grids 73 and 83 of cathode follower tubes 70 and 80 respectively. Cathode follower tubes 70 and 80 act simply as D. C. impedance transformers and the voltage of cathode 72 drops directly as the voltage impressed on its grid is decreased. The voltage at cathode 82 rises directly as the voltage impressed on its grid 83 is raised. With two megohm load resistors in the plate circuit of the bridge amplifier there is nowhere near enough current to drive a rugged relay in the plate circuit of tubes 30 and 40; however, by choosing a low value of resistance for cathode resistor 77 the output impedance of the cathode follower can easily be made as low as 2500 ohms. Furthermore, with the voltage gain available in the first stage of bridge amplification, sufficient voltage is available between cathodes 72 and 82 to drive a fairly rugged relay (10 milliamperes into 2500 ohms).

Figure 2:
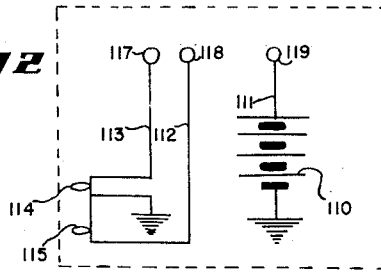
Fig. 2 is a diagram of the external connections required to employ the unit as an automatic vehicle headlight control.

Referring to Fig. 2, the external connections necessary to employ the photo electric relay circuit of Fig. 1 as an automatic headlight control are shown. Numeral 110 is the usual storage battery of the automobile connected by one terminal to ground and by the other terminal to point 119. Numeral 115 represents the high beam filaments of the vehicle headlights and is connected by one end to ground and by the other end to point 118. Low beam filament 114 is connected by line 113 to point 117 and by the other end to ground. Thus when light actuates the relay, relay armature 91 will switch the source of potential 110 from the high beam lights 115 to the low beam lights 114. When the source of light is removed, relay armature 91 returns contact 96 from contact 94 to 95 and the lights are returned to high beam.

Having thus described our invention and the advantages thereof, we do not wish to be limited to the details herein disclosed, otherwise than as set forth in the claims, but what we claim is:

1. An amplifier circuit comprising a source of electrical energy, a single stage voltage amplifier including an electronic amplifier tube having two similar electron paths with each electron path including at least a control grid, an anode, and a cathode element, a photo sensitive pickup device connected by its anode to the source of electrical energy and by its cathode to one of the control grids of the said amplifier tube, plate load resistors connected from the anodes of the said amplifier tube to the source of electrical energy, means including resistance connecting the cathodes of the amplifier tube to the low voltage return of the source of electrical energy, a power amplifier stage including a pair of electronic tubes connected as cathode follower stages, each tube containing at least an anode, a control grid and a cathode, said cathode follower tubes having their anodes connected directly to the source of electrical energy, and having their grids connected directly to the respective anodes of the aforementioned voltage amplifier tube and having cathode follower current limiting resistors connected between their respective cathodes and the low voltage return of the source of electrical energy, and a low impedance load device adapted to be connected between the cathodes of the said cathode follower stages.

2. The combination in a photoelectric amplifier circuit of a source of electrical energy, a photosensitive device connected by its anode to said source of electrical energy, a twin triode bridge voltage amplifier tube connected by plate load resistors to the source of electrical energy and by one of its control grids to the cathode of the photosensitive device, means consisting of at least a resistance connecting the cathodes of the bridge amplifier tube to the low voltage return of the source of electrical energy, a power amplification stage including two cathode follower tubes connected by their girds directly to the plates of the bridge voltage amplifier tube and by their anodes directly to the high voltage supply of the source of electrical energy, cathode current limiting resistors connected between the cathodes of the cathode follower tubes and the low voltage return, wherein an electrically operated load device may be connected between the cathodes of the cathode follower power amplification stage.

3. The combination in a photoelectric amplifier circuit of a source of electrical energy, an electronic amplifier, a phototube connected by its anode to said source of electrical energy and by its cathode to the input grid of said electronic amplifier and from said input grid to the low voltage return through a phototube load resistor on the order of 100 megohms, means connecting the cathode heater of the said electronic amplifier to the said source of electrical energy, said means being effective to reduce the heater voltage of said electronic amplifier such that the limit on the value of said phototube load resistor can be raised to the order of 100 megohms, a guard circuit connected to effectively prevent D. C. leakage between the anode and cathode connections of the said phototube and to prevent D. C. leakage from other sources of potential to the control grid of the said amplifier, wherein a load device is connected in the output of the said photoelectric amplifier.

4. The combination in a photoelectric amplifier circuit of a source of electrical energy, an input signal pickup tube connected by the anode thereof to said source of electrical energy, a bridge type voltage amplifier connected by plate load resistors to said source of electrical energy and by one of its control grids to the cathode of the pickup tube, means comprising a resistance connecting the cathodes of the voltage amplifier to the low voltage return of said source of electrical energy, means connecting the cathode heater of the said voltage amplifier to the said source of electrical energy, said means being a resistance and sufficiently reducing the voltage on the said cathode heater such that the value of resistors connected between the control grids of the voltage amplifier and the low voltage return of said source of electrical energy can be and are raised greatly over normal, a cathode follower type power amplifier consisting of two sets of amplifier tube elements arranged in a bridge circuit having the control grids of said power amplifier connected by a D. C. connection to the plates of the aforesaid voltage amplifier as well as having the anodes of said power amplifier connected directly to the high voltage terminal of said source of electrical energy, and having cathode current limiting resistors connected between the low voltage return of said source of electrical energy and the cathodes of said power amplifier, a pickup tube load resistor of the order of 100 megohms connected from the control grid of the voltage amplifier to the low voltage return of the said source of electrical energy.

5. An amplifier circuit comprising a source of electrical energy, an electronic amplifier tube having two electron paths with at least an anode and a control electrode common to each path and with a cathode of the indirectly heated type common to both paths, said tube being arranged in a bridge circuit as a voltage amplifier, plate load resistors connected between the high voltage terminal of said source of electrical energy and both anodes in said electronic amplifier tube, means including resistance connecting the cathode of said electronic amplifier tube to the low voltage return of said source of electrical energy, means comprised of a resistance conveying energy to the cathode heater of said electronic amplifier tube at a voltage reduced below the rated voltage of said heater from the aforementioned source of electrical energy, said voltage reduction being sufficient to reduce the temperature and emission of said cathode and hence the space charge in said electronic amplifier tube to a point such that the control electrode currents caused by electrons striking the control electrodes in said electronic amplifier tube are so small as to produce substantially negligible bias, resistances as high as 100 megohms connected between the low voltage return of said source of electrical energy and said control electrodes, input connection for a source of voltage to be amplified connected between one of the control electrodes of said electronic amplifier tube and the low voltage return of said source of electrical energy, and output connections from the anodes of the aforementioned electronic amplifier tube whereby the amplified output voltage may be taken from between the anodes of said electronic amplifier tube, and a photosensitive device having an anode connected to the aforesaid source of electrical energy and having a cathode connected directly by the aforesaid input connection to the control electrode of the aforesaid voltage amplifier, wherein a load resistor with a value of the order of 100 megohms for said photosensitive device is connected between said input control electrode and the low voltage return of said source of electrical energy.

6. An amplifier circuit comprising the circuit of claim 30, and a pair of additional electronic amplifier tubes each having an electron path with at least an anode, a control electrode, and a cathode of the indirectly heated type, said tubes being arranged in a bridge circuit as a cathode follower type power amplifier, the anodes of said power amplifier tubes being connected directly to the high voltage terminal of the aforesaid source of electrical energy, the cathodes of said power amplifier tubes being connected by current limiting resistors to the low voltage return of the aforesaid source of electrical energy, and the control electrodes of said power amplifier tubes being connected directly to the anodes of the aforesaid voltage amplifier tube wherein connections are made to the cathodes of said power amplifier tubes for the purpose of taking power output from the amplifier and an electric load device connected between the cathodes of the aforesaid power amplifier tubes, said load device effectively controlling a secondary source of power as a function of the intensity of light impinging on the aforesaid photosensitive device.

ROBERT W. BORDEWIECK
JAMES O. ROEBUCK.
NEAL M. SLEEPER.

REFERENCES CITED

The following references are of record in the file of this patent:

UNITED STATES PATENTS

| Number | Name | Date |
| --- | --- | --- |
| 1,658,672 | Davis | Feb. 7, 1928 |
| 1,668,383 | Smith | May 1, 1928 |
| 2,026,944 | Knight | Jan. 7, 1936 |
| 2,047,127 | Huber | July 7, 1936 |
| 2,056,392 | Boer | Oct. 6, 1936 |
| 2,090,531 | Hardin | Aug. 17, 1937 |
| 2,185,367 | Blumlein | Jan. 2, 1940 |
| 2,241,743 | Schoene | May 13, 1941 |
| 2,249,820 | Gulliksen | July 22, 1941 |
| 2,327,690 | Ackerman | Aug. 24, 1943 |
| 2,328,056 | Cooley | Aug. 31, 1943 |
| 2,339,053 | Coleman | Jan. 11, 1944 |
| 2,360,721 | Rose | Oct. 17, 1944 |
| 2,398,050 | Schreiner | Apr. 9, 1946 |
| 2,402,083 | Reid | June 11, 1946 |
| 2,429,124 | Cunningham | Oct. 14, 1947 |
| 2,452,880 | Van Beuren | Nov. 2, 1948 |
| 2,463,985 | Linde | Mar. 8, 1949 |
| 2,464,074 | Cranch | Mar. 8, 1949 |
| 2,479,274 | Simons | Aug. 16, 1949 |
| 2,482,397 | Blankenmeyer | Sept. 20, 1949 |
| 2,482,553 | Mickle | Sept. 20, 1949 |
| 2,483,126 | Davids | Sept. 27, 1949 |
| 2,492,749 | Hills | Dec. 27, 1949 |
| 2,493,307 | Moore et al. | Jan. 3, 1950 |
| 2,494,352 | Moyer | Jan. 10, 1950 |

OTHER REFERENCES

Radio Engineering by Terman 2d. ed. 1937 pbl. by McGraw-Hill Co., New York.

Radio Amateur's Handbook 1945, ed. pg. 180.